US005166839A

United States Patent [19]

Yu

[11] Patent Number: 5,166,839

[45] Date of Patent: Nov. 24, 1992

[54] RECORDING PROHIBITION REGION SETTING METHOD FOR VIDEO TAPE

[75] Inventor: Byeong-ju Yu, Taeku, Rep. of Korea

[73] Assignee: Samsung Electronics Co., Ltd., Suwon, Rep. of Korea

[21] Appl. No.: 760,827

[22] Filed: Sep. 17, 1991

Related U.S. Application Data

[63] Continuation of Ser. No. 396,273, Aug. 21, 1989, abandoned.

[30] Foreign Application Priority Data

Dec. 31, 1988 [KR] Rep. of Korea .................... 88-18100

[51] Int. Cl.[5] .............................................. G11B 15/04
[52] U.S. Cl. ........................................ 360/60; 360/66
[58] Field of Search .................................... 360/60, 66

[56] References Cited

FOREIGN PATENT DOCUMENTS 0052746 3/1987 Japan .................................... 360/60
0031083 2/1988 Japan .................................... 360/60
0130351 5/1989 Japan .................................... 360/60

*Primary Examiner*—David J. Severin
*Attorney, Agent, or Firm*—Robert E. Bushnell

[57] ABSTRACT

A video tape recording prohibition setting method is disclosed, in which only the regions of the video tape other than the prohibited region can be recorded through the utilization of the count values for the indicator by means of microcomputer control. Through the use of the method of the present invention, the troublesome task of manually switching over the system mode by the user can be removed when making some desired portion of the tape saved from being erased, and economic use of the tape achieved.

6 Claims, 5 Drawing Sheets

RECORDING PROHIBITION REGION SETTING METHOD FOR VIDEO TAPE

This is a continuation of application Ser. No. 07/396,273 filed on Aug. 21, 1989, now abandoned.

FIELD OF THE INVENTION

The present invention relates to a video tape recording prohibition region setting method applicable to video cassette recorders for both domestic and business uses and particularly to a recording prohibition region setting method by which only the other regions of a tape than the predetermined prohibition region can be recorded through the utilization of the count value for indicator and microcomputer.

BACKGROUND OF THE INVENTION

The recent trend in video cassette recorders for domestic and business uses is the elongation of the recording time, and as a result, it has become possible to load a plurality of programs in a single video tape. Among those programs loaded in a tape, some of them will be removed after regenerations of a couple of times, and some of them are for being kept permanently. Therefore, if a user wants to record a new program on a video tape which has been already fully recorded with programs, the new program should not be recorded on the portion of the tape where the programs intended for permanent keeping are recorded. Thus, if a certain portion of the tape is desired to be kept from being erased, the user has to manually switch over the system mode so that the new program should not be recorded on the undesired portion of the tape, with the result that the task is very troublesome, and that some portion of the tape can be mistakenly erased against the will of the user.

Further, in accordance with the adoption of a microcomputer in the video cassette recorder (VCR), an automatic programmed recording function is provided in the VCR. If a user wants to record a program during his absence through the utilization of such a function, it is the usual practice that the tape containing a program for permanent keeping is excluded from use, and a tape containing programs for temporary keeping or a vacant tape is used. Accordingly, there are accompanied such disadvantages that the economy in the use of video tapes is not realized due to the necessity of using a large number of tapes, and that a larger space is required for keeping the large number of tapes.

SUMMARY OF THE INVENTION

Therefore, it is the object of the present invention to provide a video tape recording prohibition region setting method by which the regions on the video tape other than the prohibited region can be automatically recorded through the utilization of the count values for the indicator by means of a microcomputer control.

In achieving the above object, the method of the present invention, for a video cassette recording in which a microcomputer, a key input module, a serve controller, and an indicator are provided includes;

(A) a recording prohibition region setting procedure including, a first stage in which the microcomputer makes a judgment as to whether there is an inputting of a recording prohibition key data, the present state will be saved upon finding of such an inputting, a rewinding will be carried out until that start sensor's detection of a start position, the count value for the indicator be initialized, a forward picture search will be carried out up to the starting positions of the intended recording prohibition region, and the function will be transferred to a still or replay mode, thereby making a judgment as to the existence or absence of an inputting of a recording prohibition key data;

a second stage in which, if there is no inputting of a recording prohibition key data for a certain predetermined period of time in the first stage, the function will return to the former state, while, if there is such an inputting, then the count value for the indicator will be saved, the function will return to a search state, and the existence or absence of an inputting of a recording prohibition key data will be detected at the ending positions of the intended recording prohibition region;

a third stage in which, if there is a recording prohibition input in the said second stage, then the count value for the indicator corresponding to the end position of the prohibited region will be saved, a recording prohibition setting completion flag will be set up, and to return to the former state;

(B) a recording with prohibited region procedure including, a first stage in which if a recording prohibition region is set up in the recording prohibition region setting procedure and if there is a prohibition release key data input, then the recording prohibition setting completion flag will be resetted, and at the same time, the prohibition key data input count will be initialized, while, if there is no inputting of the prohibition release key data and the recording prohibition setting completion flag is set up, and at the same time, if a recording mode is set up, then a rewinding will be carried out until the start sensor is activated, and a recording will be started after initiating the count value, but if the saved count value of start position and the present count value are equal each other, the recording will be paused; and a second stage in which, after the pause in the first stage above, if it is found that the start position and the end positions of the prohibited region correspond each other, then the function will be transferred to a stop mode to turn off the power, and if the said two positions do not correspond each other, then the recording will be resumed after carrying out a fast forward mode or a forward picture search mode until the present count value of the indicator and the asved count value of the end position correspond each other.

BRIEF DESCRIPTION OF THE DRAWINGS

The above object and other advantages of the present invention will become more apparent by describing the preferred embodiment of the present invention in more detail with reference to the attached drawings in which:

FIGS. 2A, 2B, 2C and 2D are flow charts illustrating the operations of the system of FIG. 1 wherein FIGS. 2A and 2B shows the recording prohibition region setting procedure, and FIGS. 2C and 2D show the recording procedure carried out after prohibition region setting.

DESCRIPTION OF THE PREFERRED EMBODIMENT

Figure 1:
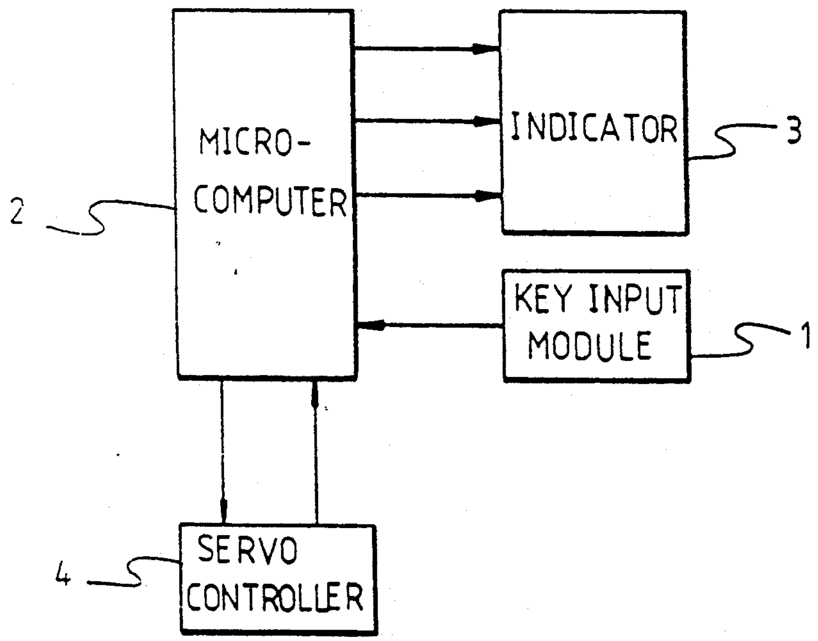
FIG. 1 is a step diagram of the system most suitable for carrying out the present invention.

As illustrated in FIG. 1, the system which is best suited for carrying out the present invention comprises;

a key input module 1 for receiving the data outputted from a remote controller or local keyboard (not shown) and for outputting the data to a microcomputer 2; an indicator 3, for example, display panel or On Screen Display (OSD), for displaying the count value in accordance with the running of the video tape, and controlled by the microcomputer 2 which operates in accordance with the data outputted from the key input module 1; and a servo controller 4 for controlling a video tape drive unit (not shown) in accordance with the control signal from the micrcomputer 2.

First, descriptions will be made to the recording prohibition region setting procedure.

Figure 2A:
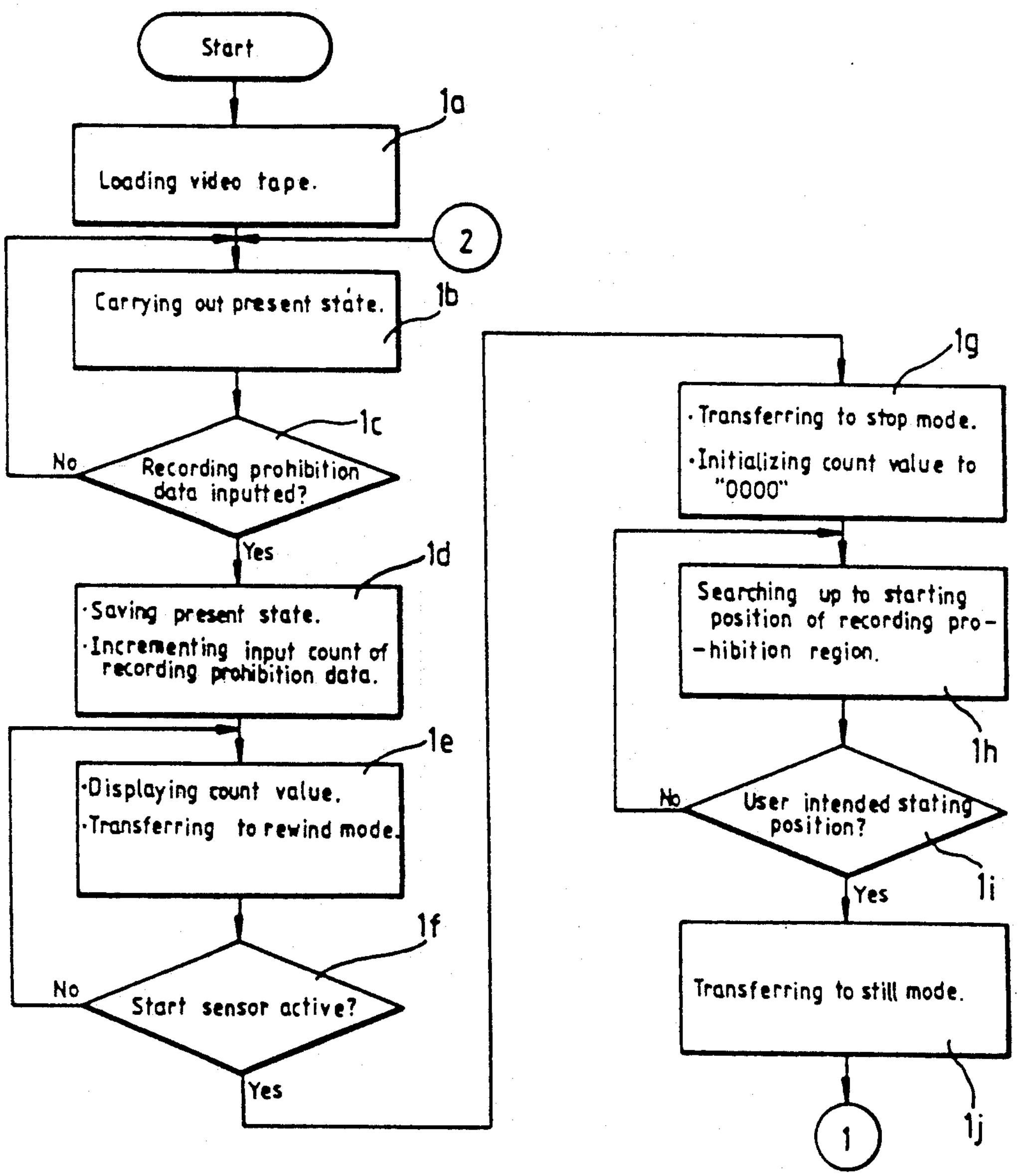

In FIG. 2A, if a user loads a video tape, preferably in the form of a cassette, into the deck of the VCR and selects a proper mode at the step 1*a*, then the video function of the present state will be performed at the step 1*b*. During the performance of the present video function as shown at the step 1*b*, a judgment in the microcomputer 2 is continually made as to whether a recording prohibition key data is input from the key input module 1 at the step 1*c*. If there is no such inputting, then the step 1*b*, the performance of the present video function, will be carried out again, while, if there is such an inputting, the step 1*d* will be carried out.

At the step 1*d*, the current performance mode and performance state of the VCR will be saved, and at the same time, the input count of the recording prohibition key data will be incremented by 1 form zero and allocated to the relevant resistor (not shown), and step 1*e* will be carried out.

At the step 1*e*, as the count value is displayed on the indicator 3, the user can find out the present position of the video tape. Then, the video function of the VCR is shifted to rewinding mode, thus rewinding is carried out to the starting position of the video tape considering the possibility of that there remains the volume of the tape on the take-up side.

At the step 1*f*, the microcomputer 2 will make a judgement as to whether the start sensor sensing start position of the tape is active (outputs "High"), and if it is not active, the step 1*e* will be carried out again to rewind the tape successively, while, if it is active, then 1*g* will be carried out as the tape rewound to the start position.

At the step 1*g*, the operation mode of the VCR will be transferred to a stop mode, the count value of the indicator 3 will be initialized to "0000", and then, the step 1*h* will be carried out.

At the step 1*h*, a forward picture search toward the recording prohibition region will be carried out, the search will be made up to the starting position of the user intended recording prohibition region, when the count values corresponding to the proceeding of the video tape are continuously displayed on the indicator 3.

At the step 1*i*, the user will make a judgment as to whether the starting position of the intended recording prohibition region is encountered, and if not, the search mode of the step 1*h* will be carried out again, while, if it is encountered, then the user transfers the function of the VCR to a still mode as the step 1*j*.

Here, watching the replaying image through TV panel, the user judges again whether to set the recording prohibition region, and to press recording prohibition key of keyboard.

Figure 2B:
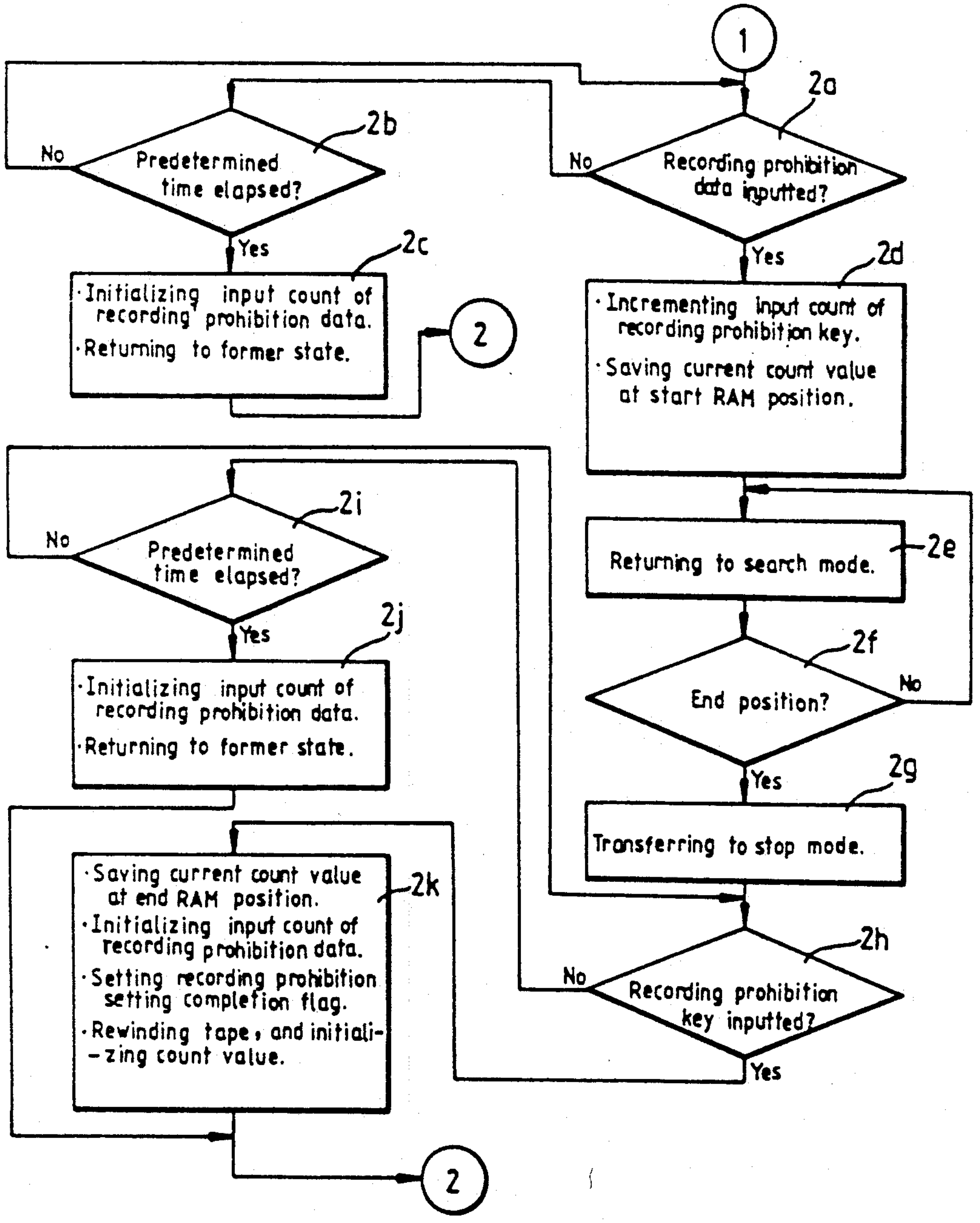

At the step 2*a*, and FIG. 2B the microcomputer 2 will make a judgement as to whether there is an inputting of a recording prohibition key data. If there is no such inputting, then a judgment will be made at the step 2*b* as to whether a certain predetermined period of time has elapsed, and if no such period of time has elapsed, then the step 2*a* will be carried out again. On the other hand, if the predetermined period of time has been elapsed, that is, if there has been no inputting of a recording prohibition data for a certain of time, then the step 2*c* will be carried out.

At the step 2*c*, the input count of the recording prohibition key data will be initialized, the former state will be restored, and the said step 1*b* will be carried out again.

At the step 2*a*, if a recording prohibition data is input, then the input count of the recording prohibition key data in the relevant register will be incremented by 1, the current count value of the indicator 3 will be saved at the start random access memory position of the microcomputer 2, and the step 2*e* will be carried out.

At the step 2*e*, the function will be transferred to a search state. Watching the image displaying on the TV panel, the user will have to make a judgment at the step 2*f* as to whether the end position of an intended recording prohibition region is reached. If it is not at such an end position, the step 2*e* will be carried out again to continue the search. On the other hand, if the end position is reached at the step 2*f*, then the user converts the VCR to the stop mode or still mode to stop the transfer of the video tape at the step 2*g*.

Here, the user finally decides to set the recording prohibition region or not if the user presses the recording prohibition key again, the microcomputer 2 will make a judgment as to the existence or absence of an inputting of a recording prohibition key data at the step 2*h*, and if there is no such an inputting, then a judgement will be made as to the elapsing of a predetermined period of time at the step 2*i*. If the predetermined period of time has not been passed, the step 2*h* will be carried out again, while, if there has been elapsed the predetermined period of time, than the step 2*j* will be carried out.

At the step 2*j*, the input count of the recording prohibition key data will be initialized, the previous state which was saved at the step 1*d* will be restored, and then, the step 1*b*, the performance of the video function of the former state, will be carried out again. That is, if there is no input data of the third recording prohibition key input for setting theend position of the recording prohibition region within predetermined period time, recording prohibition region setting procedure will not proceed further regardless of the first and the second recording prohibition key input and the system will return to the former state.

If the third inputting of a recording prohibition key data is found at the step 2*h*, then the current count value for the indicator 3 will be saved, and the input count of the recording prohibition key data will be initialized at the step 2*k*. After the initialization, a recording prohibition setting completion flag will be set up, the tape will be rewinded to the start position, and the count value of the indicator 3 will be initialized ti ∓0000", thus recording prohibition region setting procedure will be completed.

In the case where a certain intermediate position of a video tape is taken as the start position of the recording prohibition region, and the end position of the video tape is made to be corresponded with the end position of the recording prohibition region, it is desirable that the recording operation should be made to stop at the above mentioned start position. According to the present invention, for this purpose, a setting operation for a pause or still mode of the step 2*g* is carried out before the starting of the search operation of the step 2*e* after the completion of the establishment of the start position of the recording prohibition region. Then the third recording prohibition key data is input for setting the end position of the recording prohibition region. In such a case, the count values for the start position and the end position of the recording prohibition region will become equal each other.

Secondly, descriptions will be made to recording of new program on the video tape on which is set recording prohibition region in the forementioned recording prohibition region setting procedure.

Figure 2C:
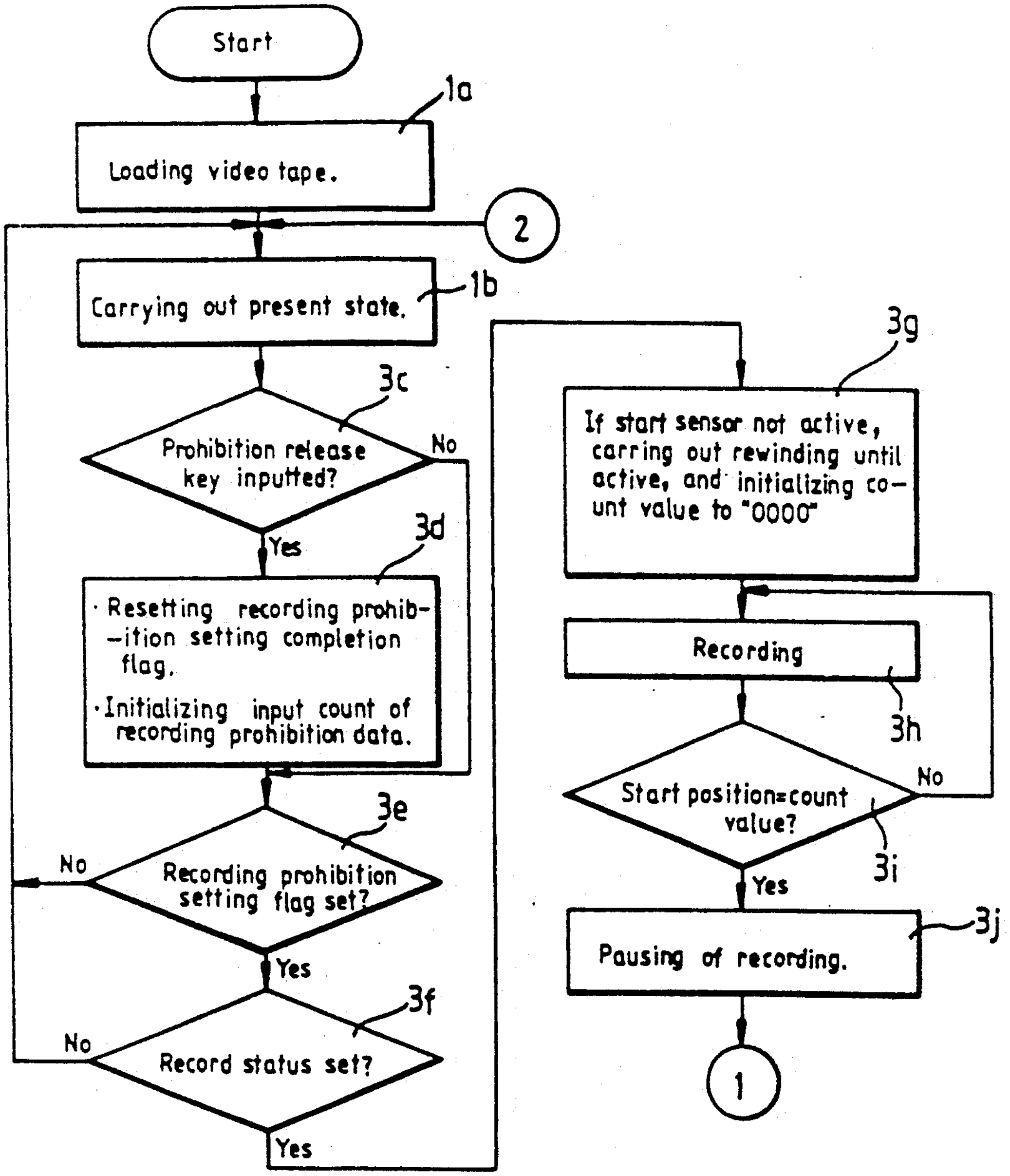

In the FIG. 2C, if a user loads a video tape, preferably in the form of a cassette, into the deck of the VCR and select a proper mode at the step 1*a*, then the video function of the present state will be performed at the step 1*b*.

Here, if the user decides to release the setting of the recording prohibition region, he will press the prohibition release key of the remocon or local key board, then the microcomputer will make a judgement as to the existence or absence of the prohibition release key data at the step 3*c*.

If there is no inputting of a prohibition release key data, then the step 3*e* will be carried out, while, if there is an inputting of such a key data at the step 3*d*, the recording prohibition setting completion flag will be resetted, and the input count for the recording prohibition key data will be initialized, and then, the step 3*e* will be carried out.

At the step 3*e*, the micrcomputer 2 will make a judgment as to whether the recording prohibition setting completion flag has been set, and if it is not set, then the step 1*b*, the performance of the former state, will be carried out again, while, if the flag is set, then the step 3*f* will be carried out.

At the step 3*f*, the microcomputer 2 will make a judgment as to whether the recording status register which memories the directions of the user is set, and if it is not set, then the step 1*b*, the performance of the former state, will be carried out, while, if it is set, then the step 3*g* will be carried out.

At the step 3*g*, a rewinding of the video tape will be carried out until the activation of the start sensor, then the count value of the indicator 3 will be initialized to "0000", the recording will be started with the indicator 3 counting the amount of the tape advance at the step 3*h*.

At the step 3*i*, the microcomputer 2 will make a judgment as to whether the count value of the indicator 3 and the starting position of the recording prohibition region which was saved in the register of the microcomputer 2 correspond to each other, and if they do not correspond to each other, then the step 3*h*, recording, will be carried out successively, while, if they do corresponding to each other, then the step 3*j* will be carried out.

Figure 2D:
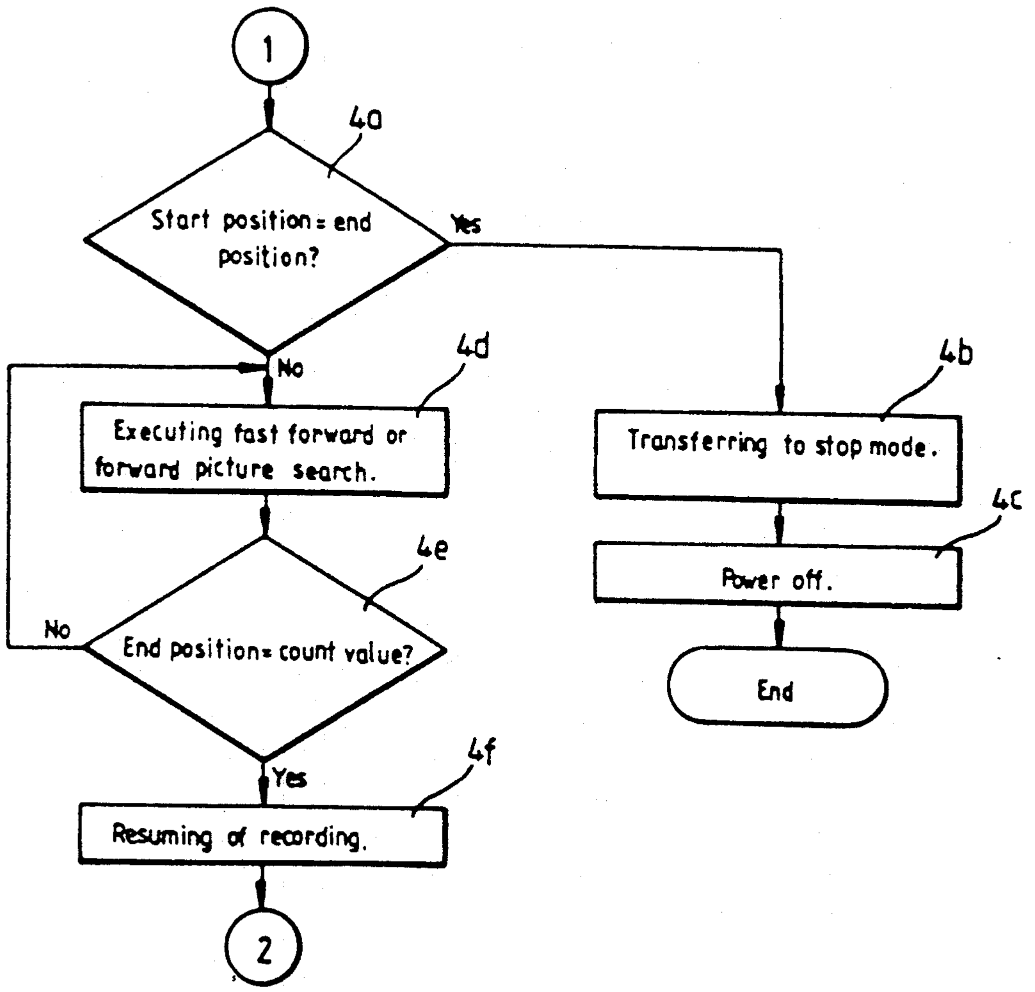

At the step 3*j* in FIG. 2D, the recording will be paused, the step 4*a* will be carried out, and the microcomputer 2 will make a judgment as to whether the starting and ending positions of the prohibited region correspond at the step 4*a*, the step 4*b* being carried out if the said two positions correspond.

At the step 4*b*, the operation will be made in the same manner as when the end sensor becomes active during the recording process, the function will be transferred to a stop mode, and the power will be turned off at the step 4*c*., thereby completing the recording.

At the step 4*a*, if the said starting and ending positions do not correspond to each other, then the step 4*d* will be carried out, and the function will be transferred to a fast forward or forward picture search mode to carry out the step 4*e*.

At the step 4*e*, the microcomputer 2 will make a judgment as to whether the count value of the indicator 3 and the value of the saved ending positions correspond to each other, and if they do not correspond to each other, the said step 4*d* will be carried out successively, while, if they correspond to each other, then the step 4*f* will be carried out.

At the step 4*f*, the function of the VCR will be transferred again to the recording mode to perform the recording for the intended period of time, and the step 1*b* will be carried out so that the system should be returned to the usual video function of the former state.

As described above, the method according to the present invention has the advantages that program or data intended for permanent keeping can be kept from being erased as recording prohibition region can be set and only the regions other than the prohibited region can be recorded through the control of a microcomputer and that economic use of a video tape can be achieved as it can be recorded on the whole tape only except the said prohibited region.

Therefore, the present invention can greatly improve the capability of a VCR, especially of that provided with ability of long playing or automatic programmed recording.

What is claimed is:

1. A recording prohibition region setting method for video cassette recorders provided with a microcomputer, a key input module, a servo controller and an indicator, comprising:

a recording prohibition region setting procedure comprising:

a first stage in which said microcomputer makes a judgment as to whether there is an input of recording prohibition key data, the present state will be saved upon finding of such an input, a rewinding will be carried out until the start sensor's detection of a start position, the count value for the indicator be initialized, a forward picture search will be carried out up to the starting positions of the intended recording prohibition region, and the function will be transferred to a still or replay mode, thereby making a judgment as to the existence or absence of an inputting of a recording prohibition key data;

a second stage in which, if there is no second inputting of recording prohibition key data for a certain predetermined period of time in said first stage, the function will return to the former state, while, if there is such an input, then the count value for the indicator will be saved, the function will return to a search state, and the existence or absence of a third input of a recording prohibition key data will be detected at the ending positions of the intended recording prohibition region; and a third stage in which, if there is a third input of recording prohibition key data in said second stage, then the end position of the recording prohibited region will be saved, a recording prohibition setting completion flag will be set up, rewinding will be carried out to initialized the count value of the indicator and to return to the former state; and a recording procedure comprising:

a first recording stage in which if a recording prohibition region is set up in said recording prohibition region setting procedure and if there is a prohibition release key data input, then the recording prohibition setting completion flag will be reset, and the prohibition key data input count will be initialized, while, if there is no input of the prohibition release key data and the recording prohibition setting completion flag is set up, and at the same time, if a recording direction is input then a rewinding will be carried out until the start sensor is activated, and a recording will be started after initiating the count value, but if the saved count value of start position and the present count value are equal to each other, the recording the pause; and a second recording stage in which, after the pause in said first recording stage, if it is found that the start position and the end position of the prohibited region correspond to each other, then the function will be transferred to a stop mode to turn off the power, and if said start position and end position do not correspond to each other, then the recording will be resumed after carrying output a fast forward mode or a forward picture search mode until the present count value of the indicator and the saved count value of the end position are equal to each other.

2. A recording prohibition region setting method for video cassette recordings provided with a micrcomputer, a key input module, a servo controller and an indicator, comprising the steps of:

setting a recording prohibition region in a video tape wherein said recording prohibition region setting step comprises:

a first stage for making a judgment as to the existence or absence of a first input of recording prohibition key data and for detecting a start position of an intended recording prohibition region in response to the first input of the recording prohibition key data;

a second stage for making a judgment as to the existence or absence of a second input of a recording prohibition key data an for detecting and end position of the intended recording prohibition region in response to the second input of recording prohibition key data;

a third stage for making a judgment as to the existence or absence of a third input of a recording prohibition key data and for setting up a recording prohibition setting completion flag in response to the third input of recording prohibition key data; and recording desired programs in regions except said recording prohibition region on said video tape, wherein said recording step comprises:

a first stage for recording said desired programs until a current tape position count value is equal to said start position of the recording prohibition region;

a second stage for checking if said start position is equal to said end position and then for transferring to a stop mode and turning off the power if said start position is equal to said position; and third stage for executing a picture search mode until a current tape position count value is equal to said end position of the recording prohibition if said start position is not equal to said end position, and then for resuming said recording step.

3. A recording prohibition region setting method as claimed in claim 2, wherein said first stage within said recording prohibition region setting step further comprises the steps of:

saving a current state of said video cassette recorder;

initializing a video tape position count value for said indicator;

carrying out a picture search mode up to said start position of the intended recording prohibition region; and transferring a function of said video cassette recorder to one of a still and a replay mode.

4. A recording prohibition region setting method as claimed in claim 3, wherein said second stage within said recording prohibition region setting step further comprises the steps of:

returning to the former state of said video cassette recorder if there is no second input of said recording prohibition key data for a certain predetermined period of time;

saving a current tape position count value as a start position and returning to the search mode of said video cassette recorder if there is the second input of said recording prohibition key data within a certain predetermined period of time; and transferring to a stop mode of said video cassette recording if a current tape position count value is equal to said end position.

5. A recording prohibition region setting method as claimed in claim 4, wherein said third stage within said recording prohibition region setting step further comprises the steps of:

returning to the former state of said video cassette recorder if there is no third input of said recording prohibition key data for a certain predetermined period of time; and saving a current tape position count value as an end position and rewinding said video tape until the tape position count value is initialized.

6. A recording prohibition region setting method as claimed in claim 5, wherein said first stage within said recording step further comprises the steps of:

judging if a prohibition release key is input or not;

resetting a recording prohibition setting completion flag and initializing an input count of recording prohibition data if the prohibition release key is input;

setting a recording prohibition setting flag and second status if the prohibition release key is not input; and pausing said recording if a current tape position count value is equal to said start position of the recording prohibition region.

* * * * *

UNITED STATES PATENT AND TRADEMARK OFFICE

CERTIFICATE OF CORRECTION

PATENT NO. : 5,166,839

DATED : Nov. 24, 1992

INVENTOR(S) : Byeong-Ju YU

It is certified that error appears in the above-indentified patent and that said Letters Patent is hereby corrected as shown below:

Column 1, line 60, after "cassette", change "recording" to --recorder--;

Column 3 line 29, before "zero", change "form" to --from--;

line 30, after "relevant", change "resistor" to --resister--;

line 67 after "step", change "2*a*, and FIG. 2B" to --2*a* in FIG. 2B,--;

Column 4 line 40 after "time, ", change "than" to --then--;

line 48 after "setting", change "theend" to --the end--;

line 61 after "initialized", change "ti ∓0000" to --to "0000--;

Column 5 line 60 after "do", change "corresponding" to --correspond--;

UNITED STATES PATENT AND TRADEMARK OFFICE

CERTIFICATE OF CORRECTION

PATENT NO. : 5,166,839 Page 2 of 2

DATED : Nov. 24, 1992

INVENTOR(S) : Byeong-Ju YU

It is certified that error appears in the above-indentified patent and that said Letters Patent is hereby corrected as shown below:

IN THE CLAIMS

| | | |
|---|---|---|
| Column 7, | line 2, | after "to", change "initialized" to --initialize--; |
| | line 20, | before "pause", change "the" to--will--; |
| | line 34, | after "cassette", change "recordings" to --recorders--; |
| Column 8, | line 4, | after "said", insert --end--; |
| | line 36 | before "if", change "recording" to --recorder--: |

Signed and Sealed this

Twenty-third Day of July, 1996

Attest:

Bruce Lehman

BRUCE LEHMAN

*Attesting Officer*

*Commissioner of Patents and Trademarks*